US008789152B2

(12) United States Patent
Gnech et al.

(10) Patent No.: US 8,789,152 B2
(45) Date of Patent: Jul. 22, 2014

(54) METHOD FOR MANAGING AUTHENTICATION PROCEDURES FOR A USER

(75) Inventors: Thomas H. Gnech, Boeblingen (DE); Rainer Himmelsbach, Boeblingen (DE); Oliver Petrik, Boeblingen (DE); Heike Schmidt, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 12/949,832

(22) Filed: Nov. 19, 2010

(65) Prior Publication Data

US 2011/0145915 A1 Jun. 16, 2011

(30) Foreign Application Priority Data

Dec. 11, 2009 (EP) .................................... 09178847

(51) Int. Cl.
*G06F 21/00* (2013.01)
*H04L 9/32* (2006.01)

(52) U.S. Cl.
USPC ............... 726/6; 713/150; 713/180; 713/194; 709/204; 709/207; 380/255; 380/276

(58) Field of Classification Search
USPC .......... 726/6, 21; 340/5.8; 713/155, 150, 180, 713/194; 709/204, 207; 380/255, 276
See application file for complete search history.

(56) References Cited

U.S. PATENT DOCUMENTS

| | | | |
|---|---|---|---|
| 6,178,511 B1 | 1/2001 | Cohen et al. | |
| 6,243,816 B1 * | 6/2001 | Fang et al. | ......................... 726/5 |
| 6,629,246 B1 | 9/2003 | Gadi | |
| 7,404,204 B2 | 7/2008 | Davenport et al. | |
| 8,132,017 B1 * | 3/2012 | Lewis | ............................ 713/183 |
| 2003/0225863 A1 * | 12/2003 | Kajino et al. | .................. 709/219 |
| 2003/0226036 A1 | 12/2003 | Bivens et al. | |
| 2004/0093599 A1 * | 5/2004 | Reynaud | ......................... 717/177 |
| 2008/0028206 A1 * | 1/2008 | Sicard et al. | ................... 713/156 |
| 2009/0126000 A1 | 5/2009 | Andreev et al. | |

OTHER PUBLICATIONS

Graf, F. Rudolf; Modern Dictionary of Electronics; Howard W. Sams & Company; p. 781.*
IEEE, "A Common Password Method for Protection of Multiple Accounts", Hui Luo, et al., 2004. vol. 3, pp. 2749-2754.
IEEE, "On the Efficient PKI System With SSO for Multi-IDS Server Service for the International Conference on Control, Automation and Systems 2007 (ICCAS 2007)", Kee-Boem Nam, et al., 2007, pp. 1677-1681.
IEEE, "Single Sign-On With One Time Password", Paras Babu Tiwari, et al., 2009, pp. 1-4.

* cited by examiner

*Primary Examiner* — Jason K. Gee
*Assistant Examiner* — Sharif E Ullah
(74) *Attorney, Agent, or Firm* — James L. Baudino

(57) ABSTRACT

A method and technique for managing authentication procedures for a user having access to several applications within a computing environment includes registering at an authentication manager different applications to which a user shall be given an authentication access by defining at the authentication manager a specific address identification allowing addressing the application specific authentication rules, logging the user to the authentication manager, the user requesting access to an application accessible by the authentication manager, and using the application specific address identification stored at the authentication manager to retrieve the application specific authentication rules for authenticating the user to the requested application.

12 Claims, 8 Drawing Sheets

METHOD FOR MANAGING AUTHENTICATION PROCEDURES FOR A USER

BACKGROUND

As security threats grow more sophisticated and information security regulations are expanded, organizations are under increased pressure to control access to sensitive data. At the same time, IT infrastructures have grown more complex, resulting in a diverse set of hardware, software, and sign-on procedures. The increasing number of user accounts and frequent password changes make it hard for people to know their passwords by heart. As a result, people often use passwords that are easy to guess (e.g., the surname of husband or wife) or select the same password for a number of applications. Moreover, 50% of users write down their password, more than two thirds of the users tell their passwords to colleagues or friends, and 47% of the users require a password reset at least once a year.

What is annoying for private users can cost companies dearly. Experts assume that password problems cause 30% to 50% of all enterprise helpdesk costs.

U.S. Pat. No. 7,496,954 describes a system for single sign-on to a plurality of computing applications. The system includes a plurality of enterprise applications, a policy server, and an authentication data store maintaining authentication information for the enterprise applications. The system also includes internal and external user authorization data stores that maintain user authorization information for the enterprise applications. A synchronization component synchronizes to a consolidated data store information from the internal and external authorization data stores and eliminates duplicate user information. To access a first enterprise application, the user's information is authenticated against the authentication data store and authorized against the consolidated authorization data store. To access a second enterprise application, the user is not required to sign on again since the previously entered user information is used to authenticate the user, and the consolidated data store is automatically checked to determine the user's authorization level for the second enterprise application. The application-specific authentication information or authentication information relates to concrete credentials (e.g., to a concrete user ID (user identification) and a concrete password) wherein the term "application-specific" means that the particular credentials of a specific enterprise application differ from general credentials. Such application-specific authentication information by way of example contain a password but no userID.

U.S. Pat. No. 7,530,097 describes a method of controlling password changes in a system having a plurality of data processing systems having separate password registries. Contents of passwords in the password registries of the data processing systems are controlled using password content policies that are centrally shared between pluralities of data processing systems. Password management tools already available on the market like PASSWORDSITTER or PASSWORD SAFE are based on such a concept as described in those prior arts.

Typically, a password manager comprises a predefined set of rules (policies for the generation of password). Therefore, only applications or data processing systems requiring a password generated according to rules known by the password manager can be supplied by the password manager. Applications or data processing systems having other rules or policies cannot be managed by the password manager. An expansion must then be performed requiring costly migration steps during an upgrade.

BRIEF SUMMARY

A method for managing authentication procedures for a user having access to several applications within a computing environment is disclosed. The method comprises registering at an authentication manager different applications to which a user shall be given an authentication access by defining at the authentication manager a specific address identification allowing addressing the application specific authentication rules; logging a user to the authentication manager, the user requesting access to an application accessible by the authentication manager; and using the application specific address identification stored at the authentication manager to retrieve the application specific authentication rules for authenticating the user to the requested application.

The application specific authentication rules can be considered as maintained in a manager called an authentication rules container, wherein a set of rules for each individual application or data processing system is contained. This is achieved by allowing the authentication rules container to have access (possibly but not necessarily by downloading and storing/alternately online) to the specific rules of each application while maintaining a relationship between the authentication rules container and its originated application using a unique application identifier.

According to one embodiment, the application specific authentication rules can comprise at least credential rules. Expediently, the authentication rules container can include any credential, such as a password or userIDs such as temporary guest userIDs, or userIDs distinguishing native users in an enterprise from associate users of customer users, and the like.

According to one embodiment, the method may further include, when registering the application to the authentication manager, downloading the application specific authentication rules to be stored together with corresponding specific address identification. Authentication rules specific for a new application are automatically transferred to the authentication manager.

According to one embodiment, the method may further include online accessing of the application specific authentication rules using specific address identification when authenticating the user to the requested application. Particularly, a Graphical User Interface may be used for managing online accessing the application specific authentication rules. As a result, the actual authentication rules are available.

According to one embodiment, the method may include further verifying a given authentication against the application specific authentication rules stored at the authentication manager.

According to one embodiment, the method may further include: generating a valid authentication according to the application specific authentication rules stored at the authentication manager, such as by considering an existing authentication history, when an authentication at a remote application is considered outdated; updating a remote application with the generated valid authentication; and storing the generated valid authentication at the authentication manager. The user is provided with a secure and comfortable method for managing credentials such as passwords in an environment with single logon performed manually per application, single sign-on performed once manually covering all participating applications, as well as in combination with a password or authentication management tool in a multi sign-on environment.

According to another aspect of the present disclosure, a program product is provided comprising a computer useable storage medium including a computer readable program, wherein the computer readable program when executed on a computer causes the computer to perform a method of: registering at an authentication manager different applications to which a user shall be given an authentication access by defining at the authentication manager a specific address identification allowing addressing the application specific authentication rules; logging an user to the authentication manager, the user requesting access to an application accessible by the authentication manager; and using the application specific address identification stored at the authentication manager to retrieve the application specific authentication rules for authenticating the user to the requested application. Expediently, a complex administration effort for mapping rules to applications can be avoided. Multiple individual applications, each supplying its own authentication rules container, can be managed by a single authentication manager.

According to another aspect of the disclosure, a data processing system is provided for execution of a data processing program comprising software code portions for performing a method when said program is run on said computer, wherein the method comprises: registering at an authentication manager different applications to which a user shall be given an authentication access by defining at the authentication manager a specific address identification allowing addressing the application specific authentication rules; logging an user to the authentication manager, the user requesting access to an application accessible by the authentication manager; and using the application specific address identification stored at the authentication manager to retrieve the application specific authentication rules for authenticating the user to the requested application. Expediently, a complex administration effort for mapping rules to applications can be avoided. Multiple individual applications, each supplying its own authentication rules container, can be managed by a single authentication manager.

According to another aspect of the present disclosure, a data processing program is disclosed for execution in a data processing system comprising software code portions for performing a method when said program is run on a computer, wherein the method comprises: registering at an authentication manager different applications to which a user shall be given an authentication access by defining at the authentication manager a specific address identification allowing addressing the application specific authentication rules; logging an user to the authentication manager, the user requesting access to an application accessible by the authentication manager; and using the application specific address identification stored at the authentication manager to retrieve the application specific authentication rules for authenticating the user to the requested application. Expediently, a complex administration effort for mapping rules to applications can be avoided. Multiple individual applications, each supplying its own authentication rules container, can be managed by a single authentication manager.

BRIEF DESCRIPTION OF THE SEVERAL VIEWS OF THE DRAWINGS

The present disclosure together with the above-mentioned and other advantages may best be understood from the following detailed description, but not restricted to the embodiments described, wherein is shown.

Figure 1:
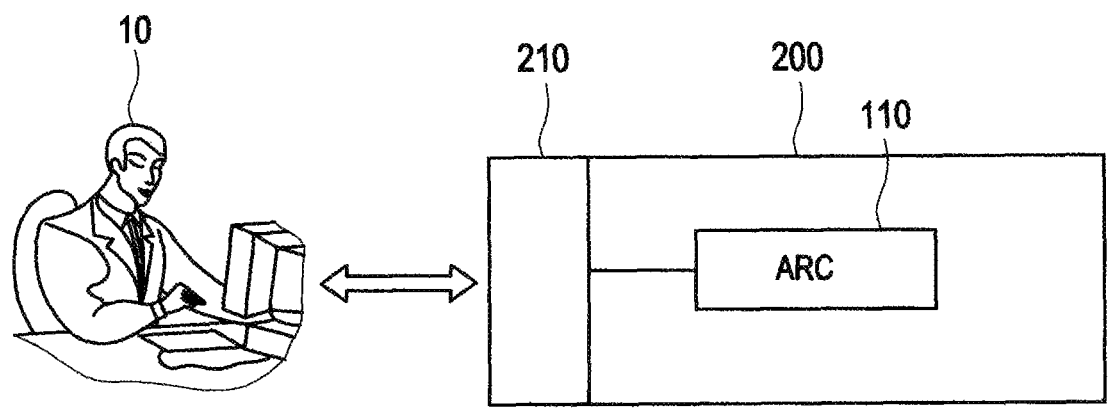
FIG. 1 is an example of a user logged on to an application via an application programming interface.

In the drawings, like elements are referred to with equal reference numerals. The drawings are merely schematic representations, not intended to portray specific parameters of the disclosure. Moreover, the drawings are intended to depict only exemplary embodiments and therefore should not be considered as limiting the scope of the disclosure.

DETAILED DESCRIPTION

In a multi sign-on environment, a logon with user identification (userID) and password per user for each single application is used (e.g., beginning with a WINDOWS client logon-on up to any application). On top, each application has its own password rules, related to syntax, character set, validity period, and the like.

Each new single password, either suggested by a tool or drafted by the user, has to be checked against the acceptance of the application, wherein it is the user's responsibility to remember each combination of userID and password and, at the same time, keep them inaccessible against third parties such as hacker or any other misuse.

As a result, many users develop individual methods to generate and manage passwords. This weakens security by predictable password generating rules and password storage locations.

To minimize the effort for the user to handle the multiple, different application credentials, by maintaining the required security levels at the same time, a way of automation for managing those credentials is provided by the present disclosure.

Since the applications in their state of the art design do not support such an automation concept, a new component is introduced. This is depicted in FIG. 1, where a user 10 logs on to an application 200 via an interface 210.

The present disclosure provides an authentication manager for authenticating the user 10 to several applications 200 using the authentication rules of each of the applications 200 either locally or directly at the application using possibly some graphics user interface 210.

According to the present disclosure, an authentication rules container (ARC) 110 is part of the application 200 and contains (1) the authentication rules, for instance password rules defining which conditions a password has to fulfil, and (2) the methods to work with the container 110.

In the following, the authentication rules container 110 is exemplified as a password rules container (PRC). It is to be understood that the authentication rules container 110 may include any credentials and is not restricted to passwords.

Contents of the ARC are for instance a set of password rules, an application identifier and methods.

A password rule defines how a password for the application is to be formed (e.g., number of characters (length), character set, history of passwords, etc.). A set of rules is a collection of single password rules a specific application 200 demands to form valid passwords for itself.

An application identifier is a unique identifier (e.g., URL, hostname+application id) that maps to the exact application instance it was downloaded from. This enables maintaining multiple containers 110 within a single password management tool (authentication manager).

Methods contained in the container 110 may include: how to create a password, how to check a password and how to get a password rules container.

Creating a password returns a valid random password according to the rules by considering an existing password history.

Checking a password verifies a given password against the rules.

Getting a password rules container 110 transfers a copy of the Password Rules Container in the application 200 to another location outside of its application 200. From this location a password tool can manage the passwords and the logon for the particular application 200.

The copy includes all password rule information and methods as well as a unique application identifier.

Figure 2:
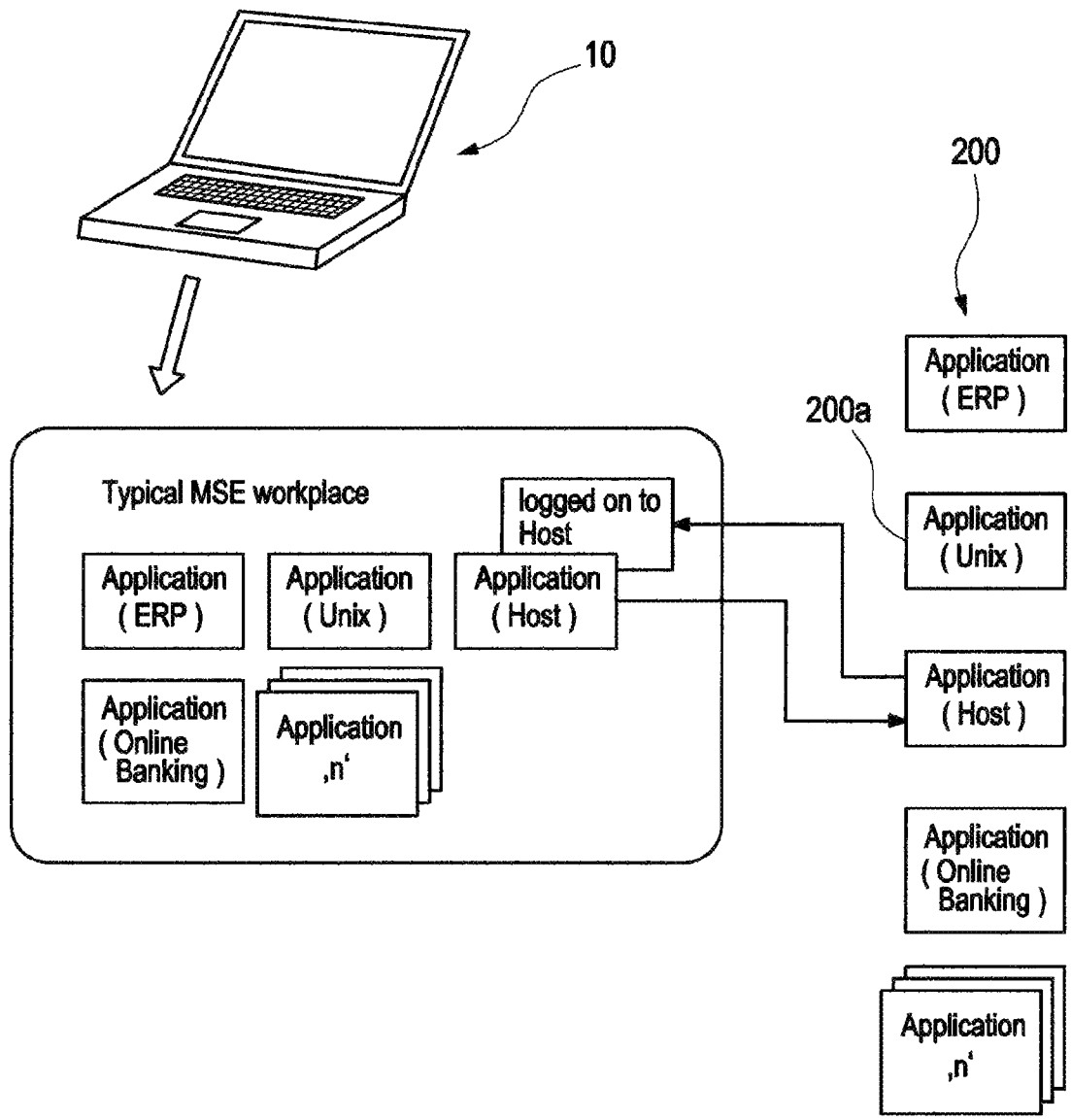
FIG. 2 is an example of a prior art multi sign-on environment.

FIG. 2 illustrates prior art solutions of password management in a multi sign-on environment.

Prior art solutions are known for individual logon, single sign-on and password tool logon. An individual logon can be performed (e.g. manually, per application 200a). A single sign-on can be performed manually, one-time, covering all participating applications 200. A password management tool (i.e., Password repository: tool for generating and managing passwords) can handle passwords for multiple applications. The password management tools help remembering passwords and userIDs. If such a tool includes functionality for creating a password, it must also include a set of rules to form that password. The rules in such a set of rules are predefined, which means, the set of rules is fixed. An administrator has to adapt a specific password rule within that set of rules to the conditions the related application demands.

A password rule defines how a password for the application is to be formed, (e.g., number of characters (length), character set, story of passwords etc.). Password rules, also called password policies, are referred to as rules in the following.

In an individual logon environment, the rules are used by the individual application itself for internal user authentication when the user requests access to this application. This results in a weakened security by avoiding high effort for administrator and user (e.g., taking paper notes and maintaining computer-based lists of passwords). Rules are known within the application only and, therefore, are not portable.

In a single sign-on environment, a set of individual applications, as discussed above, share an authentication engine by checking if a certain user is authenticated to an agreed upon common server among the participating individual applications and grant access without individual application processing its individual authentication procedure. This results in a weakened security by giving up individual rules for a common set of rules. Rules for the individual application are obsolete, and rules are known at the single authentication server only and, therefore, the rules of the individual application are not portable.

A password management tool can be used in both types of environments discussed above (i.e., in an individual logon and single sign-on environment).

Conventional password management tools help remembering passwords and userIds. If such a tool includes functionality for creating a password, it must also include a set of rules to form that password. The rules in such a set of rules are predefined, which means, the set of rules is fixed. An administrator has to adapt a specific password rule within that set of rules to the conditions the related application demands.

In a multi sign-on environment, a password management tool must cover the individual set of rules of each single participating application, and thus maintains a superset of the rules of all participating applications, along with an added effort to maintain changes in the security policies in each of the participating applications. These efforts are administration overhead to repeatedly define the specific rule set for the individual application and to configure the rules within that specific set for the individual application.

It requires a complex administration effort to map the set of rules to the application. A set of rules within an individual or single sign-on context is obsolete. A set of rules within a password management tool is fixed, predefined and not modifiable.

Figure 3:
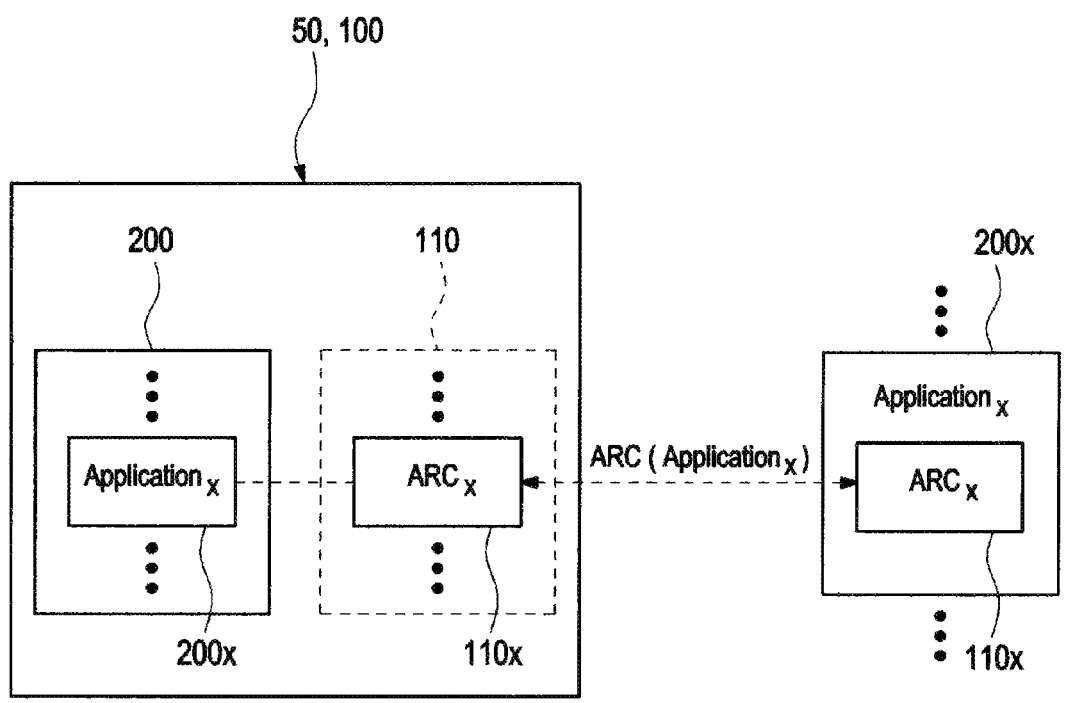
FIG. 3 is an example embodiment of an authentication manager according to the present disclosure.

FIG. 3 illustrates an embodiment for managing authentication procedures for a user having access to several applications 200, 200x within a computing environment 50 according to the present disclosure.

In an authentication manager 100, different applications 200, 200x are registered to which a user 10 shall be given an authentication access by defining at the authentication manager 100 a specific address identification allowing addressing the application specific authentication rules. The specific address identification and the application specific authentication rules are stored in an authentication rules container 110 (embodied as a password rules container).

The password rules container 110 can be used in both types of environments discussed above (i.e. in an individual sign-on and single sign-on environment). The password rules container 110 enriches the functionality of password management tools by providing a set of rules for an individual application 200x.

A password management tool can download and store the password rules container 110x with the specific rules of an application 200x, and maintains the relationship between the password rules container 110x and its originating application 200x by using a unique application identifier delivered with the PRC.

When logging a user 10 to the authentication manager 100, the user 10 requests access to an application 200, 200x accessible by the authentication manager 100. The application specific address identification stored at the authentication manager 100 to retrieve the application specific authentication rules is used for authenticating the user 10 to the requested application 200, 200x.

This technique allows managing multiple individual applications 200, 200x, each supplying its own password rules container 110, 110x, by using a single password (authentication) manager 100.

Hence, when creating passwords with this method, the application-specific rules will be applied. This ensures that a newly created password is valid according to the rules for the specific application. This can be done offline, which means the application 200, 200x itself is not required to be active.

Another implementation of the password rules container 110x can be an interface to the application 200x directly, which avoids downloading the rules and which guarantees actuality of the rules when creating a password for the specific application by online accessing the password rules container 110 from out the password (authentication) manager 100. This implementation utilizes application 200x when creating the password.

Figure 4:
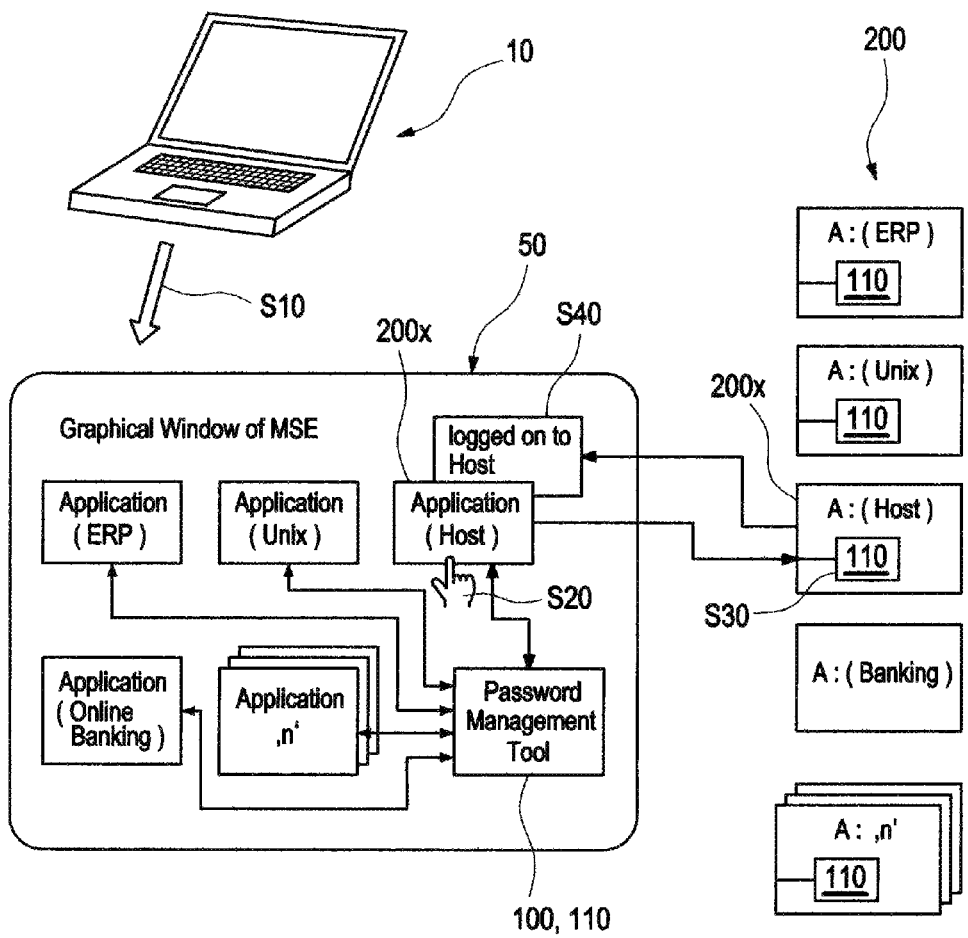
FIG. 4 is an example embodiment according to the present disclosure of an authentication system in a multi sign-on environment.

FIG. 4 illustrates a sample case of application of an authentication-rules-container based logon process to an application in accordance with the present disclosure. The authentication rules container 110 is provided in an authentication system in a multi sign-on environment (MSE) 50 including an authentication manager 100. A user 10 may access the local system via a graphical user interface of the multi sign-on environment 50.

The user 10 logs on to the personal workstation and enters the multi sign-on environment (e.g. the graphical desktop) by usual means (e.g., manual supplying the work station password) at block S10, then selects the application 200x among a multitude of applications 200 to work with. Each of the applications 200 has its own specific authentication rules container 110. Selecting may be performed, for example, with the mouse pointer by hovering over and double-clicking on the application icon at block S20 for accessing a remote application. Other ways to select an application 200, 200x might be chosen as an alternative. The selecting initiates an implicit activation of an authentication manager 100 which operates on an individual (local or remote) authentication rules container instance of that application and triggers the logon to the application 200x by using the applicable logon information (e.g., credentials like userId and password) stored within a repository provided by the authentication manager 100 at block S30. On success, the application 200x grants access to the user 10 at block S40.

Figure 5:
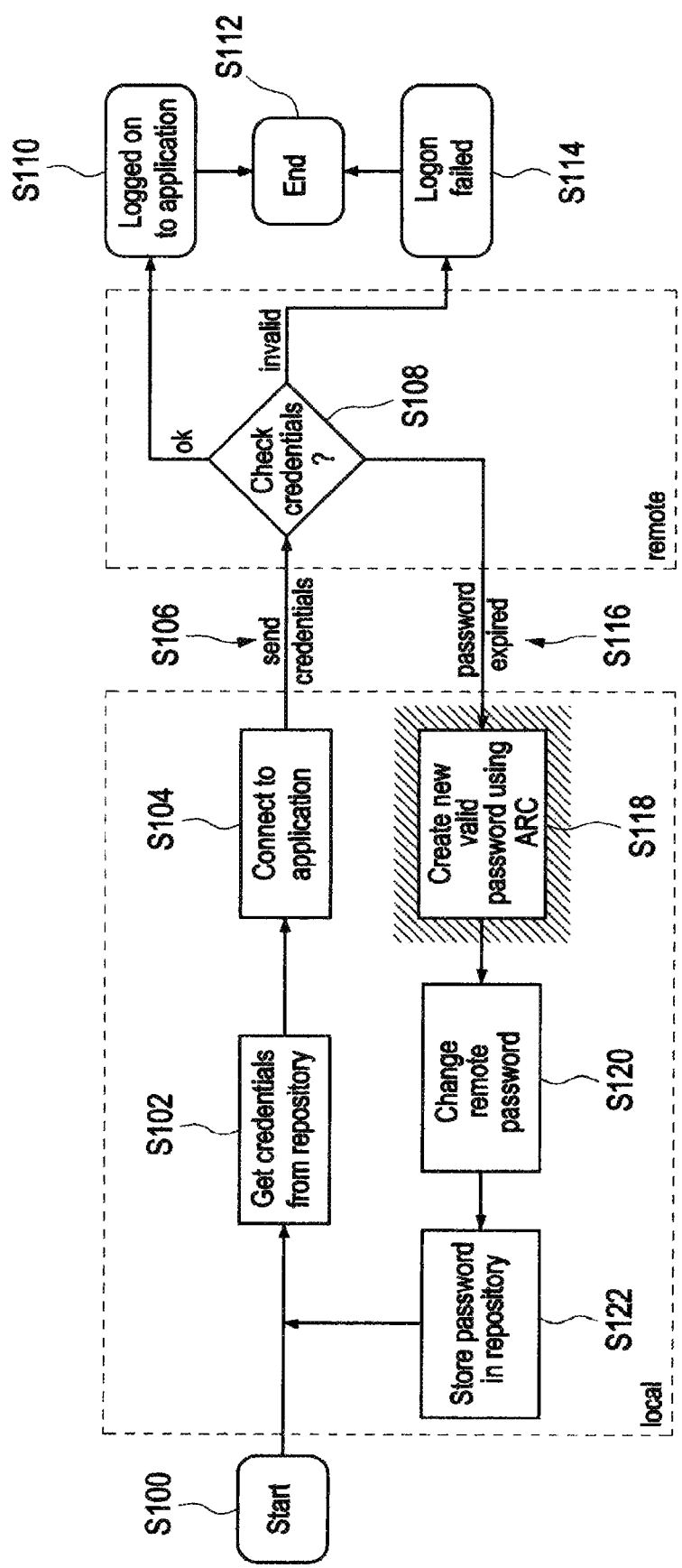
FIG. 5 is an example flow diagram of an authentication process according to the present disclosure.

FIG. 5 depicts a flow diagram for the authentication process of the user to the remote application shown in FIG. 4 in accordance with the present disclosure. After the authentication process for requesting access to an individual application is started at block S100, the credentials (e.g., userId and password) for the individual application are retrieved from a repository at block S102, the connection to the remote application is set up at block S104, and the logon activity is initiated by sending the credentials to the remote application at block S106, where the credentials are checked at block S108. On a result of "OK" of the check at block S108, which means the credentials are valid, the logon is performed successfully and access is granted to the requestor at block S110, and the authentication process completes at block S112. On a result of "invalid" of the check at block S108, which means the credentials are invalid, the request for authentication is rejected at block S114, and the process completes at block S112. On a result of "password expired" (S116) of the check at block S108, that means the local part needs to create a new password, which is valid according to the remote application's rules, by using the individual authentication rules container for that application at block S118, wherein the prior downloading of the authentication rules container from the remote application is not shown. A regular state-of-art password change activity is run at block S120 (not shown in detail), changing the password on the remote system hosting the remote application, and then, the expired password is replaced by the new password in the repository at block S122, and the authentication process is reentered at block S102.

The blocks S102, S104, S118, S120, S122 are performed in the local system (i.e., the work station mentioned in FIG. 3). The blocks S106-S116 are performed in the remote system of the application host. It should be noted that according to some embodiments, by using the authentication rules container, the new password is now checked against the rules locally.

In some embodiments, for the authentication rules container being a password rules container, the password rules can be kept secret to the public. For each application, the password rules are instantly known. There are virtually are no limits to the set of password rules, and full password rule processing is supported.

Figure 6:
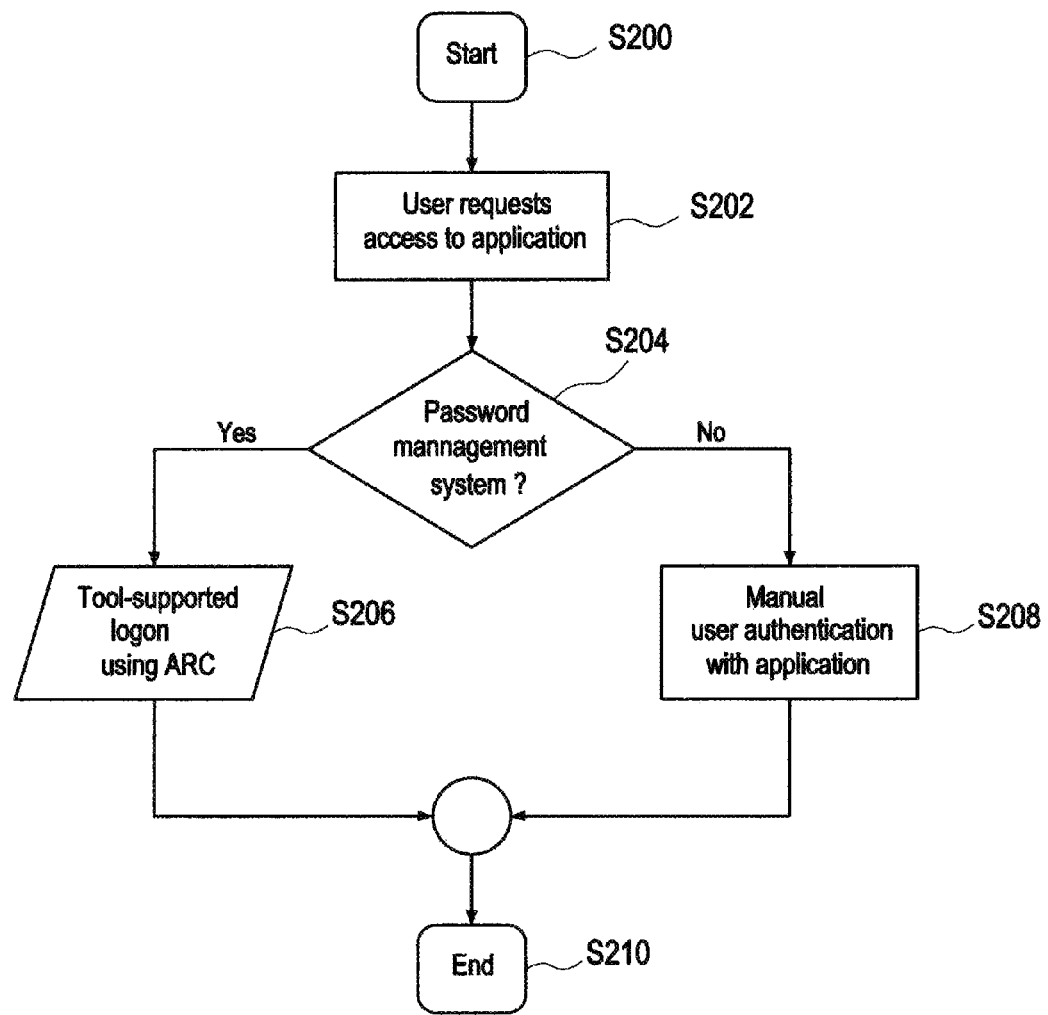
FIG. 6 is an example flow diagram of logging on to an application including a tool-supported log on according to the present disclosure.

FIG. 6 illustrates details of logging on to the application according to the present disclosure. The logon process starts at block S200 when the user selects the application for access at block S202.

At block S204 it is checked whether the application environment includes a password manager system. If the application environment includes a password manager system ("yes" in the flow chart), the logon to the application is supported by a tool using the authentication rules container at block S206 (which is shown in more detail in FIG. 7) and the process completes at block S210.

If the environment does not include a password manager ("no" in the flow chart), a manual user authentication procedure is executed at block S208 and the process completes at block S210.

Figure 7:
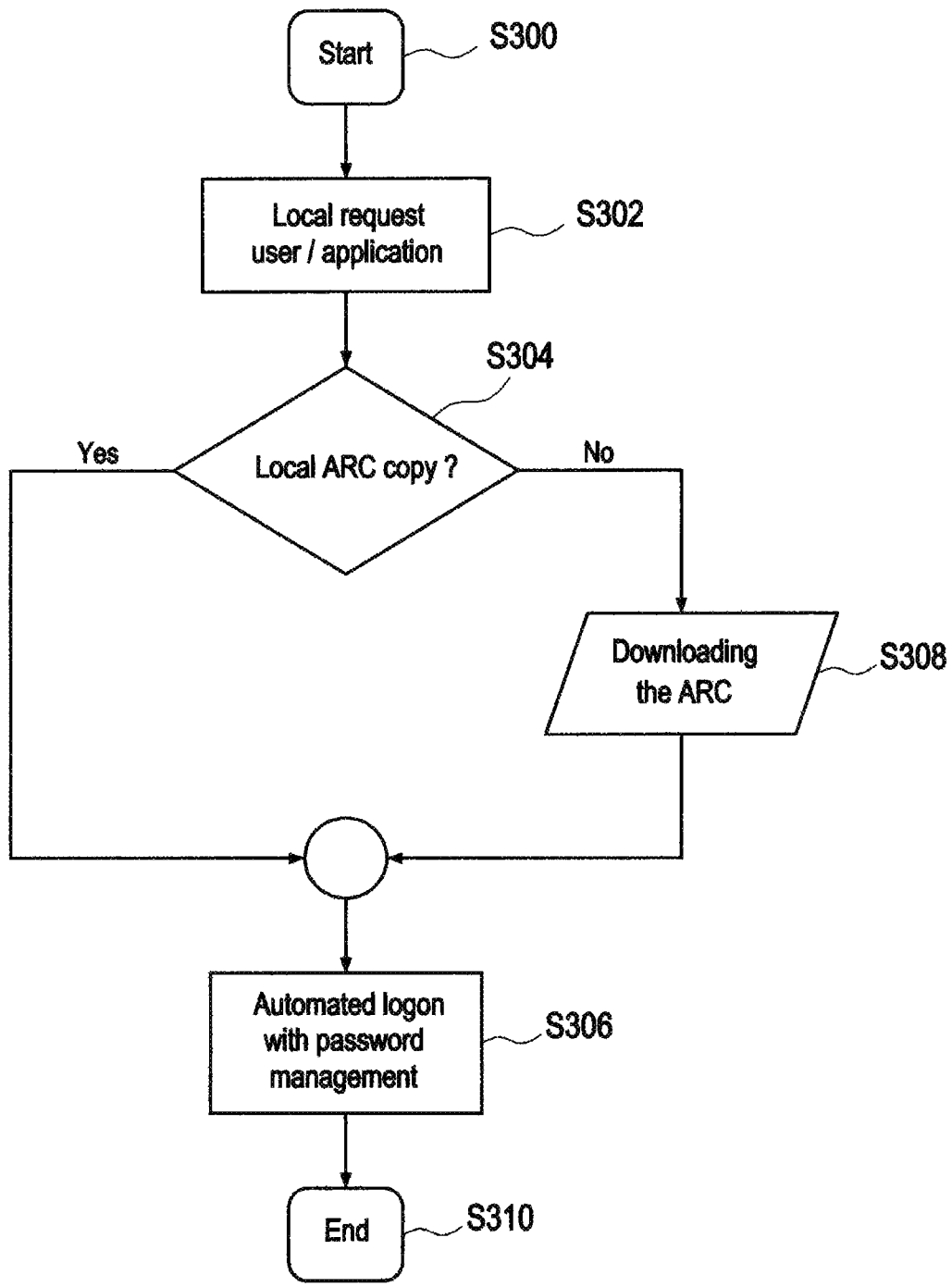
FIG. 7 is a tool-supported log on to an application according to the present disclosure indicated by FIG. 6.

FIG. 7 shows block S206 related to the tool-supported logon in more detail according to the present disclosure. The tool-supported logon process starts at block S300 when the tool receives a logon request for an application at block S302. The tool checks the presence of a local copy of the authentication rules container for the application to be logged on to at block S304.

If a local copy of the authentication rules container exists ("yes" in the flow chart), the automated logon is performed having the application-specific password rules applied at block S306 and the process completes at block S310. The automated logon includes password management according to the application rules, like changing a password at block S305.

Figure 8:
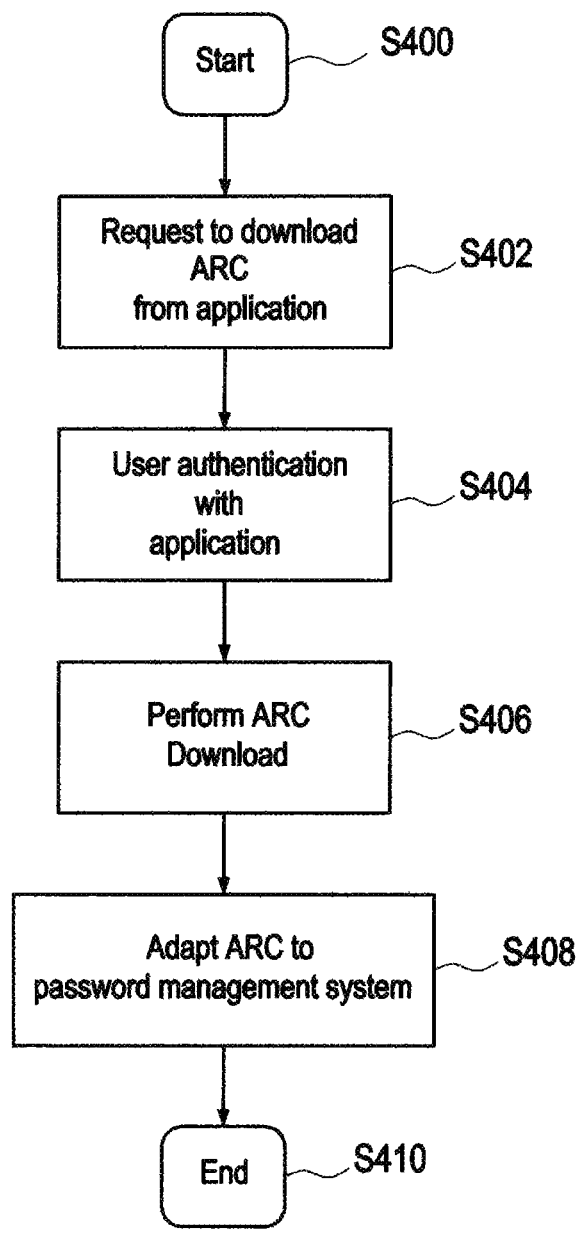
FIG. 8 is a download process of an authentication rules container according to the present disclosure.

If a local copy of the authentication rules container does not exist ("no" in the floe chart), the tool performs a authentication rules container download activity at block S308 (which is illustrated in FIG. 8 in more detail). The automated logon is performed having the application-specific password rules applied at block S306 and the process completes at block S310. The automated logon includes password management according to the application rules, like changing a password at block S306.

FIG. 8 depicts block S308 of FIG. 7 in more detail according to the present disclosure. The download process for the authentication rules container starts at block S400 when the application receives a authentication rules container download request for a user ("Get Password Rules Container" method) at block S402 and then the application initiates the user authentication procedure at block S404.

After successful user authentication at block S404, the authentication rules container download is performed at block S406, and the application-specific set of password rules is added to set of rules of the password manager system at block S408, and the process completes at block S410.

The application allows downloading the authentication rules container only for a user who is authorized to access the respective application.

For a first-time user, granting access to the application for the first time user follows a common procedure: the user is assigned an individual userID plus an initial password; the user logs on to the application and is forced to change the initial password to one new according to the policies of that application (implying that the user has knowledge about these policies); and from now on the user is granted access to the application including the capability of downloading the authentication rules container.

A user is a first time user in both cases where the user is new to the existing application environment or a new application is added to that application environment.

The authentication rules container can be applied to a password management system to extend its set of rules specifically for that individual application.

In some embodiments, the elements for automated managing of passwords or other credentials of an individual application's specific set of password (authentication) rules include: an application contains the definitions of its specific set of authentication rules (e.g., password rules) itself; an application in this context stores these rules in an authentication rules container (e.g., a password rules container) as part of itself; an application in this context provides an interface (e.g., an application programmable interface API) to download this authentication rules container, or to remotely call methods specific to this authentication rules container; a remotely operating authentication manager (e.g., password manager) enrolls to the application a first time (e.g., by logging on to the application by using the user's valid initial/actual credentials, such as userID and initial/actual password); after logon, the authentication manager downloads the authentication rules container by using application-provided methods ("get password rules container" call), stores it for that application in its own context and operates based on the rules delivered with the authentication rules container for that application or operates directly on the API of the remote application.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code which must be retrieved from bulk storage during execution.

Input/output or I/O-devices (including, but not limited to keyboards, displays, pointing devices, etc.) can be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing authentication procedures for a user having access to several applications within a computing environment, the method comprising:

registering at an authentication manager different applications to which the user shall be given an authentication access by defining at the authentication manager a specific address identification allowing addressing the application specific authentication rules;

logging the user to the authentication manager, the user requesting access to an application accessible by the authentication manager;

determining whether the requested access to the application is an initial access to the application by the user;

responsive to determining that the requested access to the application is an initial access to the application by the user, logging on to the application using a user credential assigned to the user by the application;

responsive to successfully authenticating the user credential to the application, using the application specific address identification stored at the authentication manager to retrieve the application specific authentication rules for authenticating the user to the requested application, the application specific authentication rules defining how an authentication credential is to be created for authenticating the user to the application, and wherein the authentication manager is operable to create the authentication credential while the application is inactive;

generating a valid authentication according to the application specific authentication rules stored at the authentication manager by considering an existing authentication history, when an authentication at a remote application is considered outdated;

updating a remote application with the generated valid authentication; and storing the generated valid authentication at the authentication manager.

2. The method according to claim 1, wherein the application specific authentication rules comprise at least credential rules.

3. The method according to claim 1, further comprising, when registering the application to the authentication manager, downloading the application specific authentication rules to be stored together with corresponding specific address identification.

4. The method according to claim 1, further comprising online accessing the application specific authentication rules using specific address identification when authenticating the user to the requested application.

5. The method according to claim 3, further comprising using a Graphical User Interface managing online accessing the application specific authentication rules.

6. The method according to claim 1, further comprising verifying a given authentication against the application specific authentication rules stored at the authentication manager.

7. A program product comprising a computer useable storage medium including a computer readable program, wherein the computer readable program when executed on a computer causes the computer to perform the method of:

registering at an authentication manager different applications to which a user shall be given an authentication access by defining at the authentication manager a specific address identification allowing addressing the application specific authentication rules;

logging the user to the authentication manager, the user requesting access to an application accessible by the authentication manager;

determining whether the requested access to the application is an initial access to the application by the user;

responsive to determining that the requested access to the application is an initial access to the application by the user, logging on to the application using a user credential assigned to the user by the application;

responsive to successfully authenticating the user credential to the application, using the application specific address identification stored at the authentication manager to retrieve the application specific authentication rules for authenticating the user to the requested application, the application specific authentication rules defining how an authentication credential is to be created for authenticating the user to the application;

creating the authentication credential while the application is inactive;

generating a valid authentication according to the application specific authentication rules stored at the authentication manager by considering an existing authentication history, when an authentication at a remote application is considered outdated;

updating a remote application with the generated valid authentication; and storing the generated valid authentication at the authentication manager.

8. A data processing system comprising:

a data processor; and program code executable by the data processor to perform a method comprising:

registering at an authentication manager different applications to which a user shall be given an authentication access by defining at the authentication manager a specific address identification allowing addressing the application specific authentication rules;

logging the user to the authentication manager, the user requesting access to an application accessible by the authentication manager;

determining whether the requested access to the application is an initial access to the application by the user;

responsive to determining that the requested access to the application is an initial access to the application by the user, logging on to the application using a user credential assigned to the user by the application;

responsive to successfully authenticating the user credential to the application, using the application specific address identification stored at the authentication manager to retrieve the application specific authentication rules for authenticating the user to the requested application, the application specific authentication rules defining how an authentication credential is to be created for authenticating the user to the application;

creating the authentication credential while the application is inactive;

generating a valid authentication according to the application specific authentication rules stored at the authentication manager by considering an existing authentication history, when an authentication at a remote application is considered outdated;

updating a remote application with the generated valid authentication; and storing the generated valid authentication at the authentication manager.

9. The method according to claim 1, further comprising retrieving the application specific authentication rules including definitions for a quantity of characters for the credential and a history of credentials for the application.

10. The program product according to claim 7, wherein the computer readable program when executed on the computer causes the computer to perform the method of retrieving the application specific authentication rules including definitions for a quantity of characters for the credential and a history of credentials for the application.

11. The system according to claim 8, wherein the program code is executable by the processor to perform the method comprising retrieving the application specific authentication rules including definitions for a quantity of characters for the credential and a history of credentials for the application.

12. A method for managing authentication procedures for a user having access to an application within a computing environment, the method comprising:

registering at an authentication manager an application to which the user shall be given an authentication access by defining at the authentication manager a specific address identification allowing addressing application specific authentication rules for the application;

logging the user to the authentication manager, the user requesting access to the application accessible by the authentication manager;

determining whether the requested access to the application is an initial access to the application by the user;

responsive to determining that the requested access to the application is an initial access to the application by the user, logging on to the application using a user credential assigned to the user by the application;

responsive to successfully authenticating the user credential to the application, using the application specific address identification stored at the authentication manager to retrieve the application specific authentication rules for authenticating the user to the application, the application specific authentication rules defining how an authentication credential is to be created for authenticating the user to the application, and wherein the authentication manager is operable to create the authentication credential while the application is inactive;

generating, by the authentication manager, the authentication credential for the application according to the application specific authentication rules stored at the authentication manager;

updating the application with the generated authentication credential;

storing the generated authentication credential at the authentication manager; and responsive to the generated authentication credential being considered outdated by the application, generating a new authentication credential by the authentication manager by considering an existing authentication history of the user to the application.

* * * * *